Figure 1:
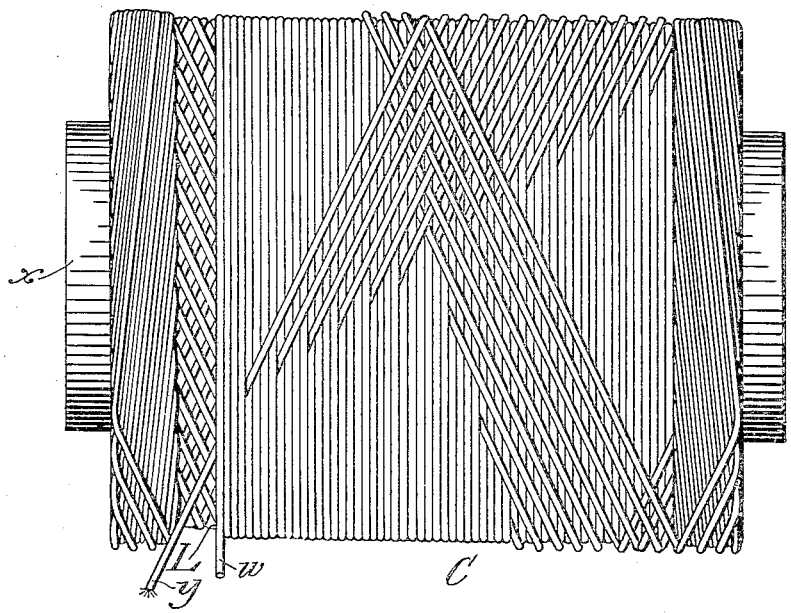

C. RYDEN.
ELECTRICAL COIL AND METHOD OF WINDING SAME.
APPLICATION FILED JAN. 30, 1915.

1,203,789.

Patented Nov. 7, 1916.
2 SHEETS—SHEET 1.

C. RYDEN.
ELECTRICAL COIL AND METHOD OF WINDING SAME.
APPLICATION FILED JAN. 30, 1915.

1,203,789.

Patented Nov. 7, 1916.

UNITED STATES PATENT OFFICE.

CLAES RYDEN, OF CRANSTON, RHODE ISLAND, ASSIGNOR, BY MESNE ASSIGNMENTS, TO UNIVERSAL WINDING COMPANY, OF BOSTON, MASSACHUSETTS, A CORPORATION OF MASSACHUSETTS.

ELECTRICAL COIL AND METHOD OF WINDING SAME.

1,203,789.  Specification of Letters Patent.  Patented Nov. 7, 1916.

Application filed January 30, 1915. Serial No. 5,296.

*To all whom it may concern:*

Be it known that I, CLAES RYDEN, a citizen of the United States, residing at Cranston, in the county of Providence and State of Rhode Island, have invented certain new and useful Improvements in Electrical Coils and Methods of Winding Same, of which the following is a specification.

My invention relates to coils for electrical purposes and consists particularly of improvements in the method of winding coils of the type shown and described in United States Patent No. 1,080,830, granted to Max Helm, Dec. 9, 1913. With this system of winding the coil is built up of alternate layers of wire and insulating-material, in which the wire is laid in close spirals while the insulating strands are wound diagonally thereof in open helices interweaving in and out among the turns or convolutions of the wire. The turns of wire are laid side by side with a slow traverse to build up the concentric layers and the strands of insulating-material, which may be of cotton yarn or other textile fiber, are laid with a quick traverse to produce the diagonal or cross-wind by what is generally known as the "Universal" system. In this way the windings of insulating-material cross and recross the wire windings in each layer of the coil and being interwoven between the different overlying layers the strands serve as a mechanical binder to link the wire windings together, secure them in place and reinforce the whole structure. The windings of insulating-material form partial layers between the layers of wire which, while not affording complete insulation, have an insulative effect and also serve as a cushioning medium between the wire layers. With this system of winding as above described it is the preferred practice to wind the layers of insulating-material with a somewhat longer traverse than that of the wire; that is to say, the windings of yarn are made to overlap the ends of the layers of wire. The purpose of this is to build a more secure foundation for the wire windings at the ends of the coil so that the end turns or convolutions of the wire will not become displaced and fall down across the ends of the layers. This overlapping of the layers of yarn also serves to build up a sort of closure or abutment at each end of the coil, and after these ends have been treated with shellac or some similar plastic compound they act in the capacity of insulating washers or heads as usually provided in other forms of coils.

My present improvement relates particularly to these closures or abutments at the ends of the coil and the object of the improvement is to make the end heads of a firmer and more solid formation. To accomplish this purpose I have devised a method of winding the yarn or other insulating-material in a harder and more compact structure at the ends of the coil and for also building it up at these points in thicker layers than throughout the other portions of the coil. That is to say, I now propose to wind on a greater mass of insulating-material at the ends of the coil where the layers project beyond the wire-windings or, in other words, with my improved process the insulating-material is built up faster at the ends of the coil than between the layers of wire. The manner of accomplishing this new method of winding the insulating-material into the coil is described in the following specification, while the means for carrying out the improved system of building up the coil is illustrated and more fully set forth in an application for patent, Serial No. 5,297, filed January 30, 1915.

Figure 2:
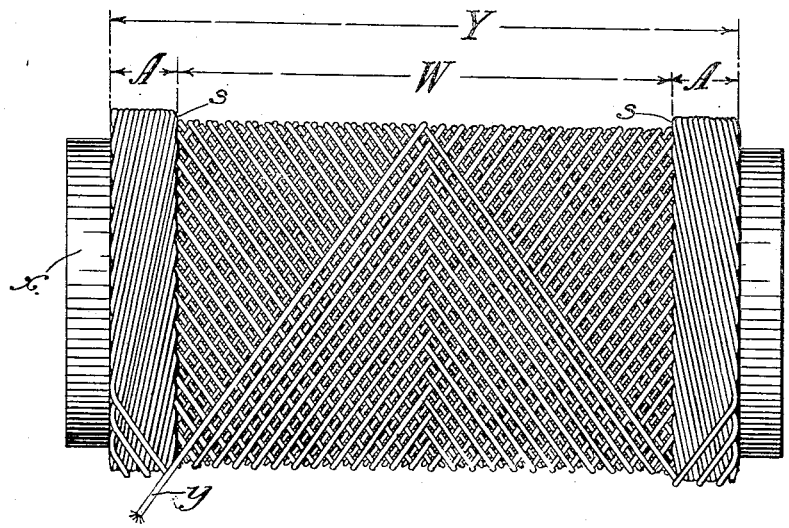
Figure 3:
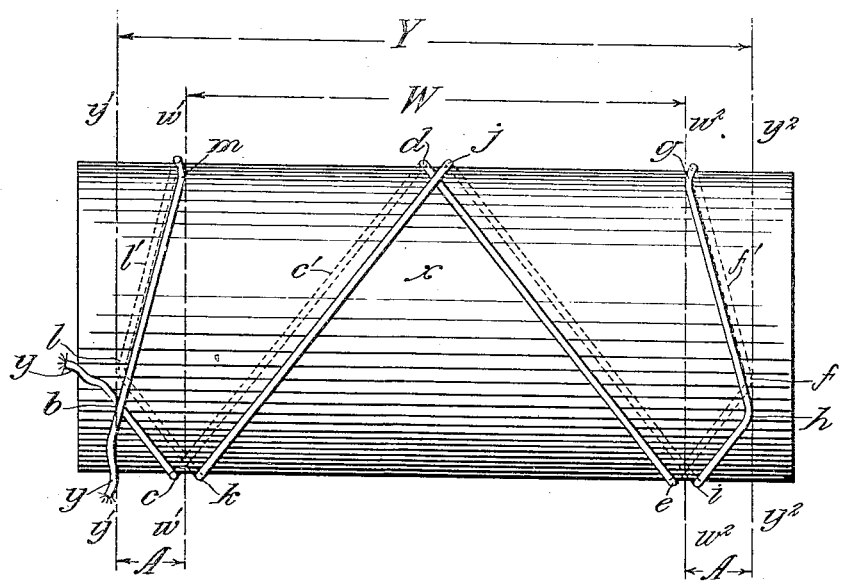

In the accompanying drawings illustrating the coil and the method of winding: Figure 1 is a general view of my improved coil showing the windings nearly completed; Fig. 2 is a view showing a few layers of yarn-windings wound on the central core without the wire to illustrate the improved method of laying the insulating-material in place to build up the end abutments; and Fig. 3 is a view showing the convolutions which a strand of yarn makes while being wound from one end of the coil to the other and back again.

Referring to the drawings, Fig. 1 illustrates a coil C in which the outside layer L of wire coils is represented as being partly incomplete in order to show the yarn-windings underneath. In the present embodiment the coil C is of cylindrical form with the layers of wire $w$ and yarn $y$ built up on a tubular core. Any other suitable form of core could be used, however, such as one of rectangular or polygonal contour, in which case the layers of windings would also conform to the outside surface of the core. The cylindrical form here shown is the most common type for use with solenoids or magnets, but the present system of winding is adaptable to other shapes in accordance with the uses to which the coil is to be applied.

In winding the type of coil described in the patent to Helm, previously referred to, two or more traverse-guides are employed adapted to be simultaneously reciprocated longitudinally of the rotating winding-spindle to lay the wire and insulating-material in place. The traverse-guide for the wire, called for convenience the wire-guide, is given a relatively slow traverse to lay the wire $w$ in closely adjacent convolutions or turns extending from one end of the layer to the other. The speed of rotation of the winding-spindle will have a certain ratio to the speed of traverse of the wire-guide in accordance with the size or diameter of the wire being wound and obviously the spindle will rotate a relatively large number of times for each traverse of the wire-guide in either direction. While the wire-guide is thus moving slowly from one end of the coil to the other, the guide for the insulating-material, called for convenience the thread-guide, will be reciprocated at a much more rapid rate so that it will make a relatively large number of traverses to one traverse of the wire-guide. Usually the traverse of the thread-guide also has a certain predetermined ratio to the speed of rotation of the winding-spindle in accordance with the length of the coil being wound. In winding a coil such as that shown in Fig. 1, for instance, the thread-guide might make one traverse from end to end of the coil during one rotation of the winding-spindle so that the yarn or thread is laid in one complete helix extending from one end of the coil to the other. In some cases, however, where the conditions of the winding are different, such, for instance, as with longer coils, the thread-guide might make one traverse to several rotations of the winding-spindle and the yarn would then be laid with a plurality of complete helices extending from one end of the coil to the other. The number of turns or helices which the yarn makes during one traverse of the thread-guide is technically known as the number of the "wind"; that is, the yarn may be wound with a "one wind," "two wind," "three wind," and so on. The number of wind best suited for any particular type of coil is usually determined by experiment based on the diameter of the wire, the size of the yarn, length and diameter of the coil and other conditions. In some cases, also, two or more thread-guides might be used for winding on the insulating-material, although in most instances only one is employed.

Heretofore, as before indicated, in winding coils of the type described the thread-guide is reciprocated back and forth along the winding-spindle with a constant traverse so that the yarn or other insulating-material is deposited with layers of a uniform wind interposed between the layers of wire and slightly overlapping their ends. It has also been explained that the strands of yarn in one layer of the insulation will pass through or intersect the turns of wire in the next overlying wire layer so that the yarn-windings weave through the layers of wire-windings and pass over and under the individual turns of the wire as shown in Fig. 1. For the sake of clearness in the drawings I have shown the yarn $y$ as being of approximately the same thickness or diameter as the wire $w$. Usually, however, the yarn will be much finer than the wire and therefore the wire layers will be considerably thicker than the yarn layers. In winding coils of relatively fine wire this disparity will not be sufficient to affect the general character of the winding, but with coarse wire it is liable to have an appreciable effect on the solidity and stability of the yarn-windings at the ends of the coil. That is to say, if the yarn does not build up as fast as required at the ends of the coil, or in proportion to the thickness of the wire layers, the end windings of the wire will have a less secure and firm foundation on which to rest and the end closures of yarn will be soft and spongy without strength to support and protect the ends of the coil. It is preferable in winding coils of the type described to use as fine a yarn as possible in order to prevent the layers of insulating-material from becoming too thick in proportion to the size of the coil. That is to say, it is desirable to make the coil as small in diameter as possible for the sake of economy in space, and for this reason very fine yarn is generally used for the insulating and binding strands even when the wire is of a considerable diameter.

In winding coils of this type the problem has been, therefore, to build up the overlapping ends of the insulating layers fast enough to support the end windings of wire without, however, causing an excessive thickness of yarn between the wire layers. To meet this problem I have now devised the novel feature of winding on more yarn at the ends of the coil than between the layers, and to accomplish this object the yarn- or thread-guide is given one or more extra, short traverses at each end of its main traverse. That is to say, after the thread-guide reaches the end of its main traverse across the coil it is caused to make one or more additional, relatively short traverses outside or beyond the traverse of the wire-guide. This peculiar action of the guide is effected through the operation of the means described in the companion application filed concurrently herewith and will be best understood by reference to Fig. 3 of the present drawings. Fig. 3 shows the tube or core $x$ with one strand of yarn wound thereon in convolutions extending from one end of the tube to the other and then back again. The dash-lines $w'$—$w'$, $w^2$—$w^2$ indicate the extremes of traverse of the wire, while the dot-and-dash lines $y'$—$y'$, $y^2$—$y^2$ represent the ends of the yarn traverse. That is to say, W represents the length of the wire layers while Y indicates the extent of the yarn layers. As before stated, the yarn-windings overlap the ends of the wire layers and A will therefore represent the thickness or width of the abutments or washers of yarn at the ends of the coil. In the present drawings, for the sake of clearness, I have shown the abutments A—A of maximum thickness, but in most instances it is only necessary to provide a very slight overlapping of the yarn-windings at the ends of the coil.

The course of the yarn in winding from one extreme of its traverse to the other and back again is as follows: Starting at the point $b$ the yarn leads at a constant, predetermined pitch or angle from one extreme of traverse $y'$ to the opposite extreme $y^2$. That is to say, from the point $b$ the yarn is laid on the front face of the tube $x$ to the point $c$; then around on the rear face of the tube to $d$, as shown by dotted lines $c'$; from $d$ back around the front face to $e$; and thence rearwardly again to $f$ which is the limit of its main traverse on the line $y^2$—$y^2$. During the time the yarn-guide is making its traverse to carry the yarn in this direction, that is from $y'$ to $y^2$, the tube $x$ will have made one complete rotation and a fraction of another turn. That is to say, as here shown the winding-spindle which carries and rotates the tube $x$ makes approximately one and a quarter turns during the traverse of the yarn-guide from $y'$ to $y^2$ which results in a one-and-one-quarter "wind" for the yarn $y$. It is to be understood, however, that this ratio between the rotation of the tube $x$ and the traversing movement of the yarn-guide is arbitrary and may be varied as desired or in accordance with the conditions of the winding. After the yarn has made this one and one-quarter turn, or one complete helix and a fraction of another, in traversing the tube from $b$ to $f$, the traverse of the thread-guide is reversed to carry the yarn back in the opposite direction. Now, at this point, the feed of the guide, instead of remaining constant, as has heretofore been the practice, is varied to change the pitch or angle of lay of the yarn. In other words, instead of feeding the guide back to the opposite end of the tube $x$ to lay the yarn in a reverse helix having the same pitch as the one already laid the speed of the guide is retarded so that the yarn is laid at a more obtuse angle to the axis of the tube. That is, starting from the point of reversal of the guide at $f$ the yarn $y$ is now laid with less inclination on the tube $x$, as shown by dotted line $f'$, extending around the rear face of the tube to the point $g$ which lies on the line $w^2$—$w^2$. At this point the direction of traverse of the thread-guide is again reversed to carry the yarn back to the point $h$ which is on the line $y^2$—$y^2$ at the extreme of its first or main traverse. At $h$ the traverse is reversed again to carry the yarn toward the opposite end of the tube and at this point the feed of the thread-guide becomes normal once more. In other words, the guide now commences to feed back at the same rate of speed as when it traversed from $b$ to $f$. The yarn will therefore be laid around the tube $x$ at the same pitch as when given its first main traverse and will lie in a convolution comprising one complete helix and a fractional part of another one. From $h$ the reversing convolution leads to $i$ on the front face of the tube; thence rearwardly as indicated by the dotted line $i'$ to $j$; thence around the front face of the tube to $k$; and then around in back to $l$ which is the extreme of its traverse in this direction. At $l$ the direction of traverse of the guide is reversed again and its speed is also once more retarded. This causes the lay of the yarn to assume a less pitch or lead and results in a less angle of inclination as shown by the dotted line $l'$. Now, when the yarn reaches the limit of its short traverse at $m$, which is on the line $w'$—$w'$ corresponding to the end of the wire traverse, its direction is again reversed to carry it back to the point $b$ which is on the line $y'$—$y'$. At this point the traverse of the thread-guide is reversed once more and the yarn is again led across the full length of the winding between the limits $y'$—$y'$ and $y^2$—$y^2$ in the same manner as first described. At the opposite end of the tube $x$ the yarn is then given its shorter, supplementary traverse before being returned to $y'$—$y'$ and the winding continues in this manner throughout the whole building of the coil. In the meantime the wire $w$ is being laid on in uniform, close helices which form the layers L as shown in Fig. 1.

In the foregoing explanation no mention has been made of the fact that each succeeding helix laid along the tube $x$ in either direction has a slight, circumferential advance or increment of lead over the preceding helix extending in the same direction. This is effected through the proper adjustment of the ratio of speed between the thread-guide and winding-spindle and is a well known feature of the Universal system of winding. Technically, it is known as the "gain," and the object is to provide that one turn or convolution of the yarn will make an advance or gain over the preceding turn to effect the side-by-side laying of the strands in each layer. In winding wire coils with the present improved system it has been found expedient to exaggerate this gain in the lead of the yarn so that instead of laying the turns side-by-side in close relation they are disposed at some little distance apart as shown in the central portion of the winding illustrated in Fig. 2. This results in a thinner layer of yarn between the wire layers and also provides a better disposition of the reinforcing strands which pass between the turns of the wire. At the ends of the coil, however, the turns of yarn are laid with a closer wind which is preferable on account of giving a more solid and harder formation. These last described features are merely supplementary details, however, and are not essential to an understanding of the principle of the invention. The main object of my improvement is to dispose more insulating-material or yarn at the ends of the coil than between the wire layers in order to build more solid and compact end abutments.

In the embodiment of the invention herein shown and described I have specified a certain preferred system as carried out in the laying of the turns of the yarn, but this may be varied as required. For instance, in some cases, instead of giving the yarn only one short traverse in each direction at the ends of its main traverse, it has been found expedient to wind with several short traverses at the ends of the coil. Also, in most cases where the yarn employed for insulation and reinforcement is very fine, I have found it expedient to have its short traverses at the ends of the coil slightly overlap within the ends of the wire layers. That is to say, instead of having the short traverse of the yarn-guide confined to a space outside the limits of the wire layers the inner end of the short yarn traverse is made to fall within the end of the wire traverse so that the yarn will be carried into the interstices at the ends of the wire layers and be thoroughly compacted into the structure at these points.

It will thus be seen that by providing for a minimum thickness of yarn between the overlying layers of wire while building up a greater thickness of the yarn at the ends of the coil I restrict the outside diameter of the completed coil within the prescribed limits while also improving the structural formation of the whole coil. In this way a much more stanch and stable coil is produced with its windings completely protected from displacement or damage and consequently providing increased electrical efficiency and greater durability. It is also called to attention that the end abutments of yarn not only serve to reinforce the structure of the coil, but in addition they act to prevent sparking or short-circuiting of the current between the end turns of the wire in the overlying layers where the potential of the current is greatest.

Various modifications might be made in the form and detail of construction of my improved coil without departing from the spirit or scope of the invention.

Therefore, without limiting myself to the exact embodiment herein shown and described, what I claim is:—

1. An improved coil for electrical purposes composed of a series of layers of conducting-material and windings of insulating-material intermingling therewith, with the windings of insulating-material interwoven over and under the turns of conducting-material in each layer and built up at the ends of the layers in a thicker, denser mass than between the layers forming reinforcing abutments at the ends of the coil.

2. An improved coil for electrical purposes composed of concentric layers of helically-wound wire and windings of textile-material disposed crosswise thereof, with the textile windings extending beyond the ends of the wire layers and built up in a thicker, denser mass outside the ends of said layers than between them forming abutments reinforcing both ends of the coil.

3. An improved electrical coil composed of alternate layers of spirally-wound wire and cross-wound yarn, with the yarn-windings crossing over and under the wire-windings in each layer and extending beyond the ends of the wire layers, at which points the yarn is compacted in a denser mass than between the wire layers forming end abutments of yarn of a diameter in proportion to the diameter of the coil.

4. An improved coil for electrical purposes composed of layers of helically-wound conducting-material and windings of insulating-material disposed diagonally or crosswise thereof, with the windings of insulating-material intersecting the layers of conducting-material and extending beyond their ends, at which points the insulating-material has a greater density and thickness than between the layers thereby providing compact washer-like abutments at the ends of the coil.

5. An improved electrical coil composed of concentric layers of helically-wound wire and overlying layers of yarn-windings, with the yarn-windings disposed crosswise of the wire-windings while intermingling therewith and extending beyond the ends of the wire layers, at which points the yarn layers are of greater thickness than between the wire layers thereby providing dense, compact masses of yarn for supporting and protecting the ends of the wire-windings.

6. An improved electrical coil composed of alternate layers of wire and insulating-material, with the wire wound in close, helical turns and the insulating-material wound in open helices laid with a relatively large number of traverses to each traverse of the wire, and with the windings of insulating-material extending beyond the ends of the wire layers and laid with additional, short traverses continued from the main traverse at these points and forming a thicker, more compact mass at the ends of the coil than between the wire layers.

7. An improved method of manufacturing electrical coils consisting in winding the wire with a relatively slow traverse to dispose it in layers of adjacent convolutions and simultaneously winding on yarn or similar textile material with a relatively fast transverse to lay it in open helices crossing and recrossing the wire-windings, with the traverse of the yarn extending beyond the traverse of the wire and disposed with a greater number of turns than where the yarn crosses the wire layers to build up a greater mass of yarn at the ends of the coil than between the layers of the wire.

8. An improved method of manufacturing electrical coils consisting in winding conducting-material in layers of helical turns and simultaneously winding insulating-material diagonally or crosswise of the conducting-material, with the windings of insulating-material passing over and under the turns of conducting-material in each layer and extending beyond the ends of said layers where the insulating-material is built up at a faster rate than between the layers to form end abutments for supporting the end convolutions of the wire in each layer.

9. An improved method of manufacturing electrical coils consisting in winding wire in concentric layers of helical turns and simultaneously winding yarn with a longer traverse than that of the wire, the yarn being wound with a plurality of traverses to each single traverse of the wire and also being laid with additional short traverses at each end of its main traverse so that the yarn is built up at a faster rate beyond the ends of the wire layers than between them to provide abutments which support the end turns of the wire and cover and protect the ends of the coil.

In testimony whereof I affix my signature in presence of two witnesses.

CLAES RYDEN.

Witnesses:
ARTHUR A. ARMINGTON,
HERBERT K. ALLARD.